United States Patent
Raisch

(10) Patent No.: US 8,955,411 B2
(45) Date of Patent: Feb. 17, 2015

(54) HYBRID DRIVE TRAIN AND GEAR-CHANGING METHOD

(75) Inventor: Stefan Raisch, Vaihingen/Enz (DE)

(73) Assignee: GETRAG Getriebe—und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 151 days.

(21) Appl. No.: 13/529,977

(22) Filed: Jun. 21, 2012

(65) Prior Publication Data
US 2012/0325048 A1 Dec. 27, 2012

(30) Foreign Application Priority Data
Jun. 22, 2011 (DE) .................... 10 2011 105 521

(51) Int. Cl.
F16H 37/06 (2006.01)
B60K 6/547 (2007.10)
B60K 6/48 (2007.10)
B60W 10/02 (2006.01)
(Continued)

(52) U.S. Cl.
CPC . B60K 6/547 (2013.01); B60K 6/48 (2013.01); B60W 10/02 (2013.01); B60W 10/08 (2013.01); B60W 10/111 (2013.01); B60W 20/00 (2013.01); F16H 3/091 (2013.01); B60K 2006/4816 (2013.01); B60W 2710/083 (2013.01); B60W 2710/1005 (2013.01); F16H 2200/0047 (2013.01); F16H 2200/0056 (2013.01); B60W 20/30 (2013.01); Y02T 10/6221 (2013.01); Y02T 10/6256 (2013.01)

USPC .......................................... 74/661; 74/665 R

(58) Field of Classification Search
USPC .................... 74/325, 329, 661, 665 A, 665 R
See application file for complete search history.

(56) References Cited

U.S. PATENT DOCUMENTS 6,258,006 B1 * 7/2001 Hanyu et al. ...................... 477/5
6,341,541 B1 * 1/2002 Sakamoto et al. .......... 74/665 A
(Continued)

FOREIGN PATENT DOCUMENTS

DE 196 12 690 6/1997
DE 197 47 265 5/1999
(Continued)

OTHER PUBLICATIONS

Search Report in German Application No. 10 2011 105 521.9, mailed Apr. 5, 2013 in 3 pages.
(Continued)

Primary Examiner — Ha D Ho
(74) Attorney, Agent, or Firm — Knobbe Martens Olson & Bear, LLP

(57) ABSTRACT

A hybrid drive train for a motor vehicle, having an internal combustion engine for making available internal-combustion-engine drive power. A multi-step transmission has a transmission input and a transmission output. The transmission input can be connected to the internal combustion engine. The multi-step transmission is designed to set up a multiplicity of different forward gear ratios. An electric machine makes available electromotive driver power. The multi-step transmission is a range-change transmission having a first transmission group and a downstream second transmission group. The electric machine is connected to the input of the second transmission group.

10 Claims, 3 Drawing Sheets

(51) Int. Cl.
    *B60W 10/08*     (2006.01)
    *B60W 10/111*    (2012.01)
    *B60W 20/00*     (2006.01)
    *F16H 3/091*         (2006.01)

(56) References Cited

U.S. PATENT DOCUMENTS

| | | | | |
|---|---|---|---|---|
| 6,506,139 | B2 * | 1/2003 | Hirt et al. | 477/3 |
| 6,722,230 | B2 * | 4/2004 | Sakamoto et al. | 74/661 |
| 6,896,635 | B2 * | 5/2005 | Tumback | 475/5 |
| 6,976,934 | B2 * | 12/2005 | Komeda et al. | 477/5 |
| 7,166,059 | B2 * | 1/2007 | Reitz et al. | 477/5 |
| 7,625,311 | B2 * | 12/2009 | Dilzer | 477/5 |
| 2002/0033059 | A1 * | 3/2002 | Pels et al. | 74/329 |

FOREIGN PATENT DOCUMENTS

| | | |
|---|---|---|
| DE | 197 47 465 A1 | 5/1999 |
| DE | 199 45 474 A1 | 4/2000 |
| DE | 199 31 311 A1 | 4/2001 |
| DE | 10 2005 048 938 | 4/2007 |
| DE | 10 2005 048 938 A1 | 4/2007 |
| DE | 10 2010 030 576 A1 | 12/2011 |
| EP | 1 972 481 A1 | 9/2008 |
| EP | 1972481 | 9/2008 |
| WO | WO 2008/138387 A1 | 11/2008 |
| WO | WO 2012/000704 A1 | 1/2012 |

OTHER PUBLICATIONS

German Exam Report; Application No. 10 2011 105 521.9; Oct. 22, 2013.

* cited by examiner

HYBRID DRIVE TRAIN AND GEAR-CHANGING METHOD

CROSS-REFERENCE TO RELATED APPLICATIONS

This application claims the priority of German patent application DE 10 2011 105 521, filed Jun. 22, 2011.

BACKGROUND OF THE INVENTION

The invention relates to a hybrid drive train for a motor vehicle, having an internal combustion engine for making available internal-combustion-engine drive power, a multi-step transmission having a transmission input and a transmission output, wherein the transmission input can be connected to the internal combustion engine, and wherein the multi-step transmission is designed to set up a multiplicity of different forward gear ratios, and an electric machine for making available electromotive drive power.

In addition, the present invention relates to a motor vehicle having such a hybrid drive train, and to a method for carrying out a gear change in a hybrid drive train.

Hybrid drive trains for motor vehicles are known in different embodiments. In many hybrid drive trains an electric machine is connected to a transmission input. Hybrid drive trains of this type permit the electric machine to be used for boosting or else for purely electric drive. In this case, all the forward gear ratios of the multi-step transmission can be used in the electric driving mode. However, in this case the electric machine cannot be used to make available tractive force assistance during gear changes. This is possible in such hybrid drive trains in which the electric machine is connected to the output of the multi-step transmission. However, in this case a purely electric driving mode can be used only with a single transmission ratio. In addition, charging in the stationary state (using the electric machine as a generator for charging an electric energy store when the vehicle is stationary) is generally not possible.

In addition, hybrid drive trains are also known in which the multi-step transmission is embodied as a double-clutch transmission. Such transmissions in themselves already permit a gearshift without interruption of the tractive force. In this context it is known, for example, to connect an electric machine to one of the two component transmissions of such a double-clutch transmission, generally to the transmission input. However, hybrid drive trains of this type are very complex and many functions are carried out in duplicate.

Document DE 197 47 265 A1 discloses a hybrid drive train in which no separate gear set for the reverse driving mode is set up in the multi-step transmission, with the result that reverse travel is only possible by means of an electric motor.

Document DE 10 2005 048 938 A1 discloses a hybrid drive train having a double-clutch transmission, wherein an electric machine can be effectively connected both to a first and a second input shaft via an additionally provided transmission.

Document EP 1 972 481 A1 discloses a hybrid drive train in which a gear-shift component transmission has an input shaft and an output shaft, wherein, for example, uneven gear ratios are assigned to the first component transmission. In addition, the drive train contains a second gear-shift component transmission having an input shaft and an output shaft, wherein, for example, the even gear ratios are assigned to this component transmission. The input shaft of the first gear-shift component transmission can be coupled to the internal combustion engine via a starter clutch. The input shaft of the second gear-shift component transmission has a drive connection to the electric machine. In addition, the two input shafts can be connected to one another in a rotationally fixed fashion via a coupling unit.

Finally, document DE 196 12 690 C1 discloses a drive train having an automated transmission which is embodied as a range-change transmission with a first transmission group and a downstream second transmission group.

BRIEF SUMMARY OF THE INVENTION

Against the above background, an object of the invention is to specify an improved hybrid drive train, a motor vehicle which is equipped therewith as well as a method for carrying out a gear change.

The above object is achieved in the hybrid drive train mentioned in the beginning in that the multi-step transmission is a range-change transmission having a first transmission group and a downstream second transmission group, wherein the electric machine is connected to the input of the second transmission group.

In addition, the above object is achieved by means of a motor vehicle having such a hybrid drive train.

Finally, the above object is achieved by means of a method for carrying out a gear change in a hybrid drive train, in particular of the type specified above, having the steps: opening of a clutch of a transmission which has a first and a downstream second transmission group; making available tractive force by means of an electric machine which is connected to an input of the second transmission group; disengaging a source gear ratio which is set up by the first and the downstream second transmission group by opening a shift clutch of the first transmission group; and engaging a target gear ratio.

With the hybrid drive train according to the invention, the internal combustion engine can be operated with all the forward gear ratios of the multi-step transmission. The electric machine can drive the motor vehicle with the different transmission ratios of the second transmission group. The total number of forward gear ratios is generally obtained in a range-change transmission by multiplying the number of transmission ratios which can be set up in the first transmission group by the number of transmission ratios which can be set up in the second transmission group.

The multi-step transmission can be embodied with a single transmission input, that is to say can be implemented in the manner of an automated manual transmission. Complex double-clutch arrangements or transmission input shaft arrangements with an inner shaft and a hollow shaft as in the case of a double-clutch transmission are not necessary in the hybrid drive train according to the invention.

Connecting the electric machine to the input of the second transmission group or to some other suitable point between the first transmission group and the second transmission group also makes it possible to carry out gear changes in which the electric machine makes available tractive force for bridging the interruption in tractive force which otherwise occurs.

Accordingly, the hybrid drive train can be operated in a very comfortable way.

The transmission input may be, for example, a transmission input shaft. The transmission output can be connected, for example, to a differential which distributes the drive power between two drive shafts. The drive shafts may be connected, for example, to driven wheels of the motor vehicle. However, the driven shafts can also be connected to a first and/or second axle of the motor vehicle.

Consequently, it is generally possible to implement a hybrid drive train with high functionality and a comparatively simple basic design, with the result that a large number of functions are possible in a small space. In this context, the drive train can also be low in weight and have low friction loss, so that the drive train can be implemented with low consumption.

Instead of a first transmission group and a second transmission group, the range-change transmission can also have multiple transmission groups. For example, the second transmission group can in turn be composed of two sub-transmission groups. As a result, if appropriate the number of forward gear ratios which are available for the electric machine for the purely electric drive of the motor vehicle can be increased.

The first transmission group and the downstream second transmission group each preferably have at least two different transmission ratios. It is preferred if the first transmission group has a larger number of different transmission ratios than the second transmission group.

In the method according to the invention it is preferred to close the separation clutch again after the engagement of the target gear ratio and to terminate the making available of tractive force by means of the electric machine.

The opening of the separation clutch and the making available of tractive force preferably occur here in an overlapping fashion, with the result that the driver of a motor vehicle has the highest possible level of comfort. In the same way, the termination of the making available of tractive force and the closing of the separation clutch after the engagement of the target gear ratio can also take place in an overlapping fashion.

The above object is therefore completely achieved.

According to one particularly preferred embodiment, at least one forward gear ratio of the multi-step transmission is set up by bypassing the second transmission group.

This measure makes it possible likewise to carry out gear changes for which it is necessary to shift transmission ratios in the second transmission group, using this at least one forward gear ratio in such a way that no interruption in tractive force occurs and/or tractive force assistance can take place. Accordingly, in the method according to the invention it is advantageous if the target gear ratio bypasses the second transmission group.

It is particularly preferred here if the at least one forward gear ratio, which bypasses the second transmission group, is the n+1th forward gear ratio of the multi-step transmission, wherein n is the number of forward transmission ratios which can be set up in the first transmission group.

As a result it is possible firstly to use the different transmission ratios of the first transmission group when shifting up the forward gear ratios. The subsequent forward gear ratio is the one which bypasses the second transmission group. This is then followed in turn by a forward gear ratio which uses the first transmission ratio in the first transmission group when the second transmission ratio is shifted.

The use of such a bypass or change forward gear ratio also permits, if appropriate, shifting from this gear ratio into any other of the forward gear ratios, wherein in many cases such a gear change can take place with electrical tractive force assistance.

It is particularly preferred overall if the multi-step transmission has a transmission input in the form of a transmission input shaft, and layshaft.

Such multi-step transmissions are generally known in the form of layshaft transmissions.

In this context, the various forward gear ratios are implemented by means of gear set arrangements which generally contain spur gears which mesh with one another (generally with a fixed gear and a freely moving gear or shift gear).

It is of particular advantage here if the first transmission group has first gear set arrangements which are configured to connect the transmission input shaft and the layshaft.

In this context, the first transmission group can be constructed as a conventional manual or automated transmission. It is possible to provide freely moving gears on the transmission input shaft or on the layshaft, wherein the fixed gears which mesh therewith are arranged on the respective other shaft.

In addition, it is advantageous overall if the second transmission group has second gear set arrangements which are configured to connect the layshaft to a differential for distributing drive power between two drive shafts.

In this embodiment it is particularly preferred if the gear set arrangements each have a fixed gear and a freely moving gear, wherein the fixed gears are preferably connected to an input element of the differential, wherein the freely moving gears which mesh therewith are rotatably mounted on the layshaft.

As a result, a drive train which is also particularly compact in the radial direction can be implemented.

It is also advantageous here if the first and/or the second gear set arrangements each have a shift clutch.

The shift clutches can be implemented as dog clutches, but they are embodied, in particular, as synchronous shift clutches and, particularly preferably, as shift clutches with locking synchronization.

In this context, it is possible to have recourse to proven components from the field of manual multi-step transmissions.

It is also particularly advantageous if the electric machine is connected to the layshaft.

The connection is preferably a drive connection here so that a motor shaft always rotates with a rotational speed proportional to the rotational speed of the layshaft. The connection can be made in any desired way here. For example, the machine shaft of the electric machine can be connected to the layshaft via a constant gear set. In the simplest case, the electric machine can also be connected to a direction-of-rotation reversal gear which is provided in any case in the multi-step transmission in order to implement a reverse gear ratio. In this context, the forward transmission ratio of the electric machine can be adapted without influencing the other transmission ratios. At the same time, the need for a separate transmission step is avoided.

Alternatively, it is also possible to arrange the electric machine coaxially with respect to the lay shaft or to another shaft which connects the first transmission group and the second transmission group.

In addition, it is possible to arrange the electric machine coaxially with respect to the transmission input shaft, for example adjacent to starter clutch. In this case, it is advantageous if the electric machine is connected to a freely moving gear which is connected to the layshaft (for example a freely moving gear of the reverse gear ratio).

Further it is overall preferred if the internal combustion engine is connected to the transmission input via a starter clutch.

The starter clutch may be, for example, a dry friction clutch and is preferably activated in an automated fashion.

In this context it is readily apparent that the shift clutches which are present in the drive train are also preferably activated in an automated fashion.

It is readily apparent that the features which are mentioned above and which are still to be explained below can be used not only in the respectively predefined combination but also in other combinations or alone without departing from the scope of the present invention.

BRIEF DESCRIPTION OF THE SEVERAL VIEWS OF THE DRAWING

Exemplary embodiments of the invention are illustrated in the drawing and are explained in more detail in the following description, in which.

DETAILED DESCRIPTION OF THE INVENTION

Figure 1:
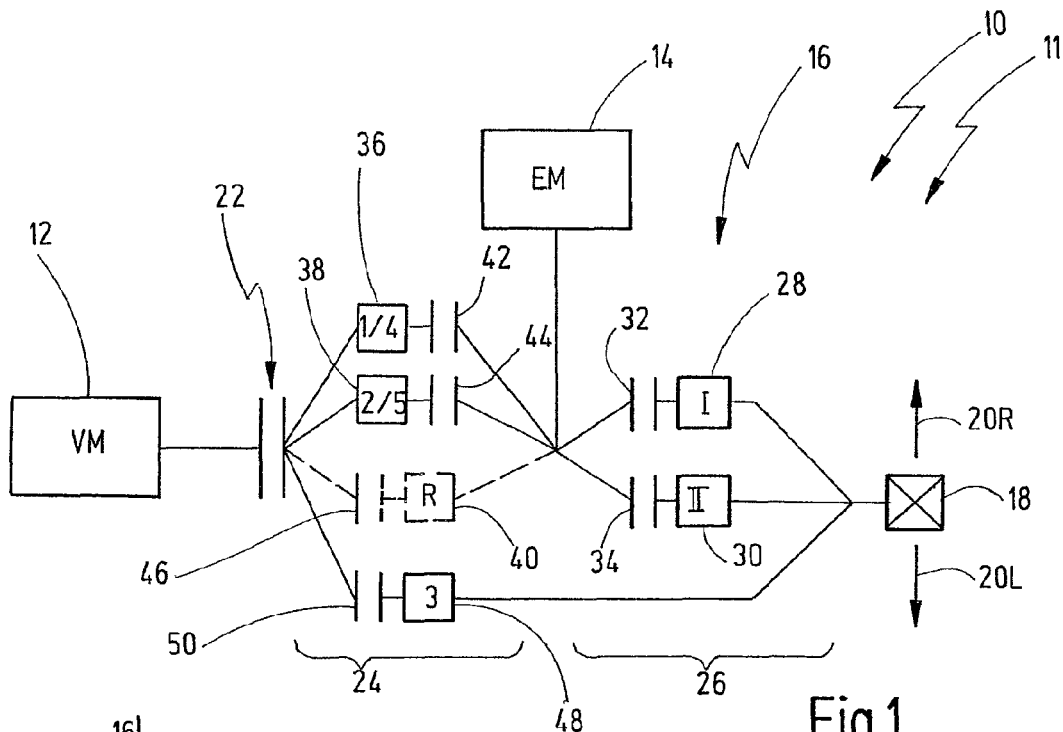
FIG. 1 shows a schematic illustration of an embodiment of a hybrid drive train according to the invention.

A first embodiment of a drive train according to the invention is illustrated in schematic form in FIG. 1 and denoted generally by 10. The drive train 10 serves to drive a motor vehicle 11, for example in the form of a passenger car.

The drive train 10 has a first drive motor in the form of an internal combustion engine (or in the form of a fuel cell engine) 12 and a second drive motor 14 in the form of an electric machine. The two drive motors 12, 14 are each configured to make available drive power for driving the motor vehicle 11.

In addition, the drive train 10 contains a multi-step transmission 16 which is preferably embodied as a layshaft design. An output (not denoted in more detail) of the multi-step transmission 16 is connected to a differential 18, by means of which drive power can be distributed between two drive shafts 20L, 20R. The drive shafts 20L, 20R are preferably connected to driven gears of the motor vehicle 11. Alternatively it is possible for the drive shafts 20L, 20R to be connected to two driven axles of the motor vehicle 11.

The internal combustion engine 12 is connected to an input of the multi-step transmission 16 via a starting clutch 22. The starting clutch 22 may be embodied, for example, as a dry friction clutch but it can also be embodied as a wet-running clutch (for example a multi-disc clutch).

The multi-step transmission 16 is embodied as a range-change transmission, having a first transmission group 24 and a downstream second transmission group 26.

The electric machine 14 is connected to the input of the second transmission group 26 (or the output of the first transmission group 24). The second transmission group 26 contains a multiplicity of different transmission ratios which can each be alternatively be shifted into the power flux. The second transmission group 26 preferably has a first transmission ratio I and a second transmission ratio II, as is shown at 28 and 30, respectively. The first transmission ratio 28 can be shifted into the power flux by means of a first shift clutch 32 of the second transmission group 26. The second transmission ratio 30 can be shifted into the power flux by means of a second shift clutch 34 of the second transmission group 26. Accordingly, the electric machine 14 can drive the motor vehicle 11 by means of the first transmission ratio 28 when the clutch 32 is shifted or by means of the second transmission ratio 30 when the clutch 34 is shifted.

The first transmission group 24 contains a first transmission ratio 1/4 and a second transmission ratio 2/5 as is shown at 36 and 38, respectively. In addition, the first transmission group 24 can contain a reverse gear ratio transmission ratio R, as is illustrated by dashed lines at 40 in FIG. 1. If the multi-step transmission 16 contains such a reverse gear ratio transmission ratio R, the motor vehicle 11 can be driven in reverse by means of the internal combustion engine 12. If such a transmission ratio 40 is not included in the first transmission group 24, the vehicle 11 can be driven exclusively in the reverse direction by means of the electric machine 14.

A first shift clutch 42 of the first transmission group 24 is assigned to the transmission ratio 36 for the gear ratios 1/4. A second shift clutch 44 of the first transmission group 24 is assigned to the transmission ratio 38. A third shift clutch 46 of the first transmission group 24 is, if appropriate, assigned to the reverse gear ratio transmission ratio R.

In addition, the multi-step transmission 16 contains a transmission ratio 3, as shown at 48, to which a further shift clutch 50 is assigned. The transmission ratio 48 bypasses the second transmission group 26 here and is coupled directly to an output of the multi-step transmission 16.

Consequently, the multi-step transmission 16 has five forward gear ratios and optionally one reverse gear ratio. An internal-combustion-engine drive of the motor vehicle can be set up in all five forward gear ratios. For the first gear ratio, the shift clutches 42, 32 are shifted or closed here, and for the second gear ratio the shift clutches 44, 32 are shifted or closed. In the third gear ratio only the clutch 50 is shifted, and the clutches 32, 34 are respectively opened.

In the fourth gear ratio, the shift clutches 42, 34 are closed. In the fifth forward gear ratio the shift clutches 44, 34 are closed.

In the reverse gear ratio R, the shift clutch 46 and the shift clutch 32 (or 34) are closed.

The shift clutches of the multi-step transmission 16 can be embodied here as dog clutches, but preferably as synchronous clutches, in particular as locking synchronizer clutches. Multi-step transmissions with shift clutches of this type and just a single transmission input, which is connected to a drive motor such as the internal combustion engine 12 via a single starter clutch 22, generally permit gear changes only with interruption of the tractive force.

However, in the presence case the electric machine 14 is connected to the input of the second transmission group 26. Accordingly, in the case of gear changes in which the starter clutch 22 is opened to carry out a gear change and consequently no drive power can be transmitted to the differential 18 by the internal combustion engine 12, the electric machine can make available a "filling torque" so that gear changes can be made without an interruption of the traction force. If a gear ratio which bridges the second transmission group 26 (as in the present case the gear ratio 3) is not provided, tractive force assistance by means of the electric machine 14 cannot be carried out for just those gear changes in which the transmission ratio in the second transmission group 26 has to be shifted.

However, in order to make available tractive force assistance for all gear changes, the multi-step transmission 16 has in the present case a forward gear ratio (gear ratio 3) which is set up by bypassing the second transmission group 26. This is preferably the n+1th forward gear ratio of the multi-step transmission if n is the number of transmission ratios which can be set up in the first transmission group 24. In the present case n=2 (36, 38) with the result that the bypass forward gear ratio is the gear ratio 3.

In the case of a gear change from, for example, gear ratio 2 to gear ratio 3 or from gear ratio 3 to gear ratio 4, it is possible with this design of the multi-step transmission 16 to use the electric machine 14 to make available a tractive force assistance torque, as will be described in detail below.

Figure 2:
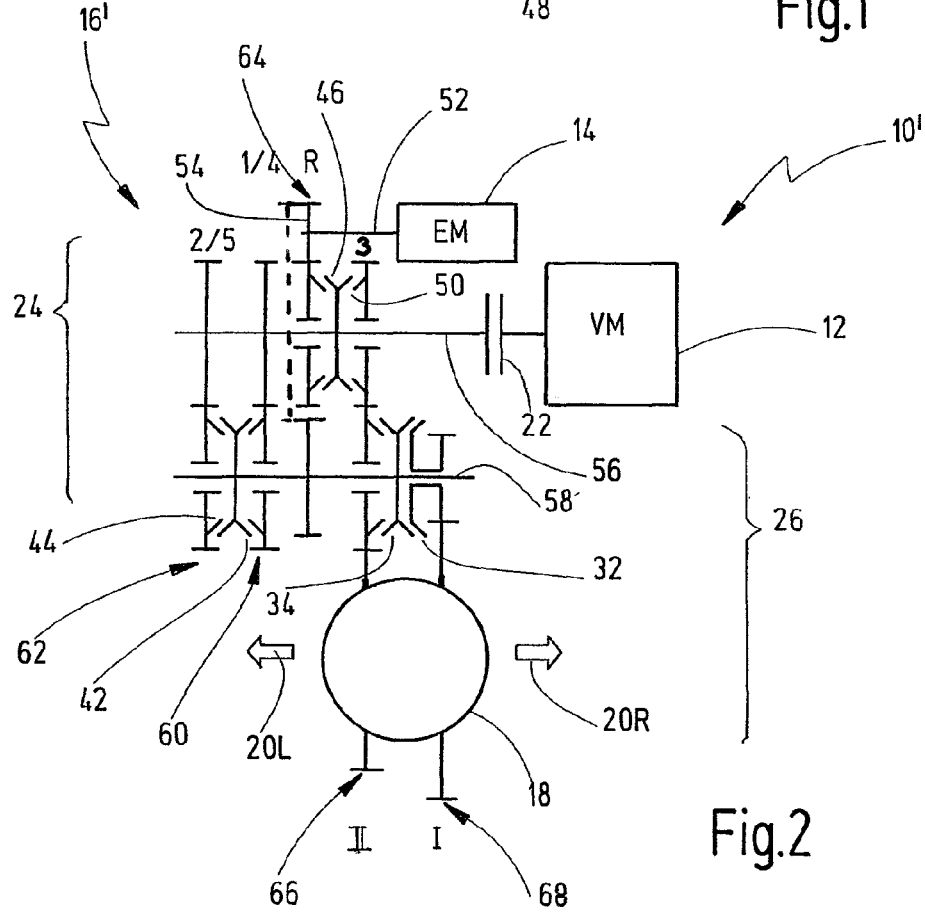
FIG. 2 shows a schematic longitudinal sectional view through a further embodiment of a hybrid drive train according to the invention.

In FIG. 2, a further embodiment of a hybrid drive train according to the invention is illustrated schematically and denoted generally by 10'. The drive train 10' in FIG. 2 generally corresponds, in terms of the method of functioning, to the drive train 10 shown in FIG. 1. Identical elements are therefore provided with identical reference symbols. The drive train 10' constitutes a possible way of implementing the basic concept shown in FIG. 1 for such a drive train. Basically, structural details are therefore explained below.

The multi-step transmission 16' is for example embodied with a layshaft design, similarly to an automated multi-step transmission. In this context, gear sets which have at least one freely moving gear and one fixed gear are respectively assigned to the particular transmission ratios or gear ratios 2/5, 1/4, R, 3, wherein the freely moving gear or shift gear can be connected to an assigned shaft by means of a respective shift clutch.

In the present case, a gear set for the reverse gear ratio R is provided. For the purpose of simple connection of the electric machine 14 to the input of the second transmission group 26, a motor shaft 52 of the electric machine 14 is permanently connected to a direction-of-rotation reversal gear 54 of this gear set. Alternatively, it is however also possible to provide a separate gear set for the connection of the electric machine 14 to the input of the second transmission group 26. Alternatively, a coaxial arrangement of the electric machine 14 with respect to an input of the second transmission group 26 is also possible.

The multi-step transmission 16' has in the present case a transmission input shaft 56 which is connected in a rotationally fixed fashion to an output element of the starter clutch 22. In addition, the multi-step transmission 16' has a layshaft 58 which is parallel thereto. The layshaft 58 forms in the present case an input of the second transmission group 26. For this reason, the electric machine 14 could also be arranged coaxially with respect to the layshaft 58.

The multi-step transmission 16' has a first gear set arrangement 60 for the gear ratios 1/4, and a second gear set arrangement 62 for the gear ratios 2/5. The gear set arrangements 60, 62 each have a freely moving gear which is rotatably mounted on the layshaft 58, and a fixed gear which is connected in a rotationally fixed fashion to the transmission input shaft 56. A clutch package with the first and second shift clutches 42, 44 of the first transmission group 24 is arranged between the freely moving gears of the gear set arrangements 60, 62.

In addition, the multi-step transmission 16' contains a third gear set arrangement 64 for the reverse gear ratio R. This gear set arrangement 64 contains a freely moving gear which is rotatably mounted on the transmission input shaft 56, and a fixed gear which is connected in a rotatably fixed fashion to the layshaft 58, as well as the direction-of-rotation reversal gear 54.

Finally, the multi-step transmission 16' contains a fourth gear set arrangement 66 and a fifth gear set arrangement 68. The fourth gear set arrangement 66 includes a freely moving gear which is rotatably mounted on the transmission input shaft 56. A clutch package with the shift clutches 46, 50 is arranged between freely moving gears, rotatably mounted on the transmission input shaft 56, of the gear set arrangements 64, 66.

The fourth gear set arrangement 66 also includes a freely moving gear which is rotatably mounted on the layshaft 58, and a fixed gear which is connected in a rotationally fixed fashion to an input element of the differential 18. The fifth gear set arrangement 68 includes in a corresponding way a freely moving gear which is rotatably mounted on the layshaft 58, and a fixed gear which is connected in a rotationally fixed fashion to the input element of the differential 18. A third clutch package with the shift clutches 32, 34 is arranged between the freely moving gears, which are rotatably mounted on the layshaft 58, of the gear set arrangements 66, 68.

The method of functioning of the drive train 10' in FIG. 2 corresponds to that of the drive train 10 in FIG. 1, as described above.

Figure 3:
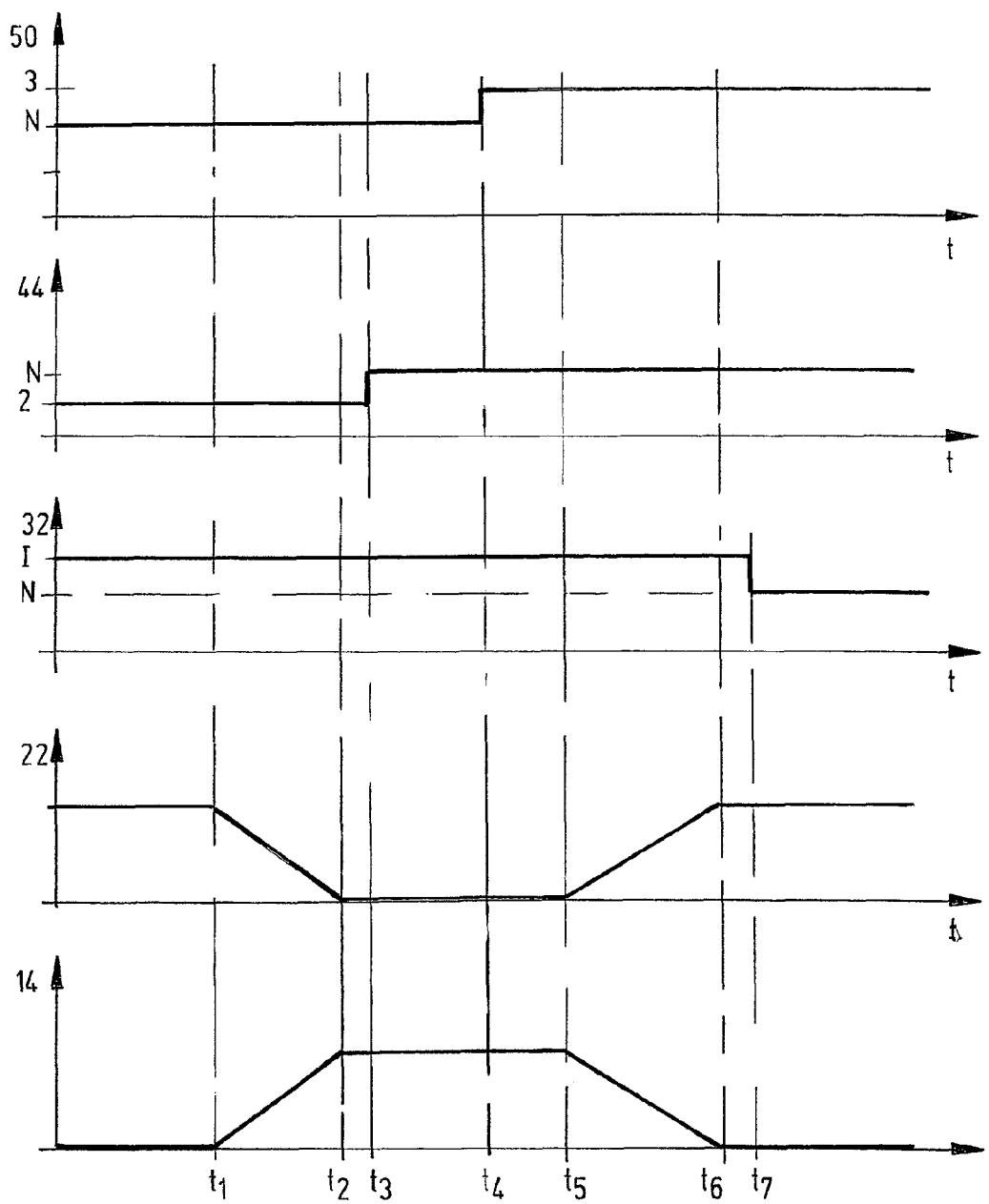
FIG. 3 shows time flow charts illustrating an embodiment of a method according to the invention for carrying out a gear change.

FIG. 3 illustrates by way of example a time flow chart which illustrates the gear change from the gear ratio 2 into the gear ratio 3 in the drive train 10' in FIG. 2.

Up to a time $t_1$, the vehicle 11 drives in the gear ratio 2. The shift clutch 50 is therefore opened, the shift clutch 44 is closed and the shift clutch 32 is also closed. In addition, the starter clutch 22 is closed, with the result that the drive power can be conducted from the internal combustion engine 12 via the starter clutch 22, the transmission ratio 38 and the transmission ratio 28 to the differential 18. Up to the time $t_1$, the electric machine 14 additionally makes available no torque.

At the time $t_1$, a gear change into the gear ratio 3 is initiated. In this context, the starter clutch 22 is opened, and this process is terminated at the time $t_2$. In order to compensate the associated interruption of tractive force, a filling torque is made available via the electric machine 14. After the starter clutch 22 is opened at the time $t_2$, the shift clutch 44 is opened (shifted to neutral N) at the time $t_3$. The electric machine 14 also makes available a filling torque, which is transmitted to differential 18 via the transmission ratio 28 when the shift clutch 32 is closed.

At the time $t_4$, the shift clutch 50 is closed, with the result that the output element of the starter clutch 22 is connected to the differential 18 via the transmission ratio 48.

At the time $t_5$ the process of closing the starter clutch 22 again is started, which is finalized at the time $t_6$. In parallel to this, the torque which is made available by the electric machine 14 is reduced, with the result that at the time $t_6$ internal-combustion-engine drive power is exclusively transmitted via the closed starter clutch 22 and the transmission ratio 48 of the gear ratio 3 to the output of the multi-step transmission 16. The shift clutch 32 of the first transmission ratio 28 of the second transmission group 26 can subsequently be opened.

Starting from this state, it is possible to shift back into the gear ratio 2 or else into the subsequent gear ratio 4.

These gear changes can also be carried out by means of the electric machine 14 with interruption of the tractive force.

In the case of gear changes in which the second transmission group 26 does not have to be shifted (for example from 1 to 2), the gear change in the first transmission group 24 takes place as in the case of an automated transmission by virtue of the fact that the starter clutch 22 is opened. Subsequently, in the case of a gear change from 1 to 2, the shift clutch 42 is opened, and subsequently the shift clutch 44 is closed. In the intermediate time period, tractive-force-assisting torque can be made available by the electric machine 14 by means of the unchanged transmission ratio 28 in the second transmission group 26.

The drive trains 10, 10' in FIGS. 1 and 2 each have five forward gear ratios and one reverse gear ratio. In these cases, a reverse driving mode can also be set up by means of the internal combustion engine 12.

Alternatively to this, it is possible to omit the reverse gear ratio R in these drive trains. In this case, the electric machine 14 would have to be connected via its own gear set to the layshaft 58, or would have to be arranged coaxially with respect to said layshaft 58 or with respect to the transmission input shaft 56 (in the latter case it is then connected to the layshaft 58 via a further gear set).

If a reverse gear ratio R is dispensed with, a reverse driving mode can be set up solely by means of the electric machine 14 via the second transmission group 26.

In addition, it is possible to extend the drive trains 10, 10' shown in FIGS. 1 and 2 with further forward gear ratios. In this context, further gear sets have to be provided on the layshaft 58 and the transmission input shaft 56. If a bypass gear ratio is provided (like the bypass gear ratio 3 in FIGS. 1 and 2), it can be changed as a function of the number of gear ratios in the first transmission group 24.

Figure 4:
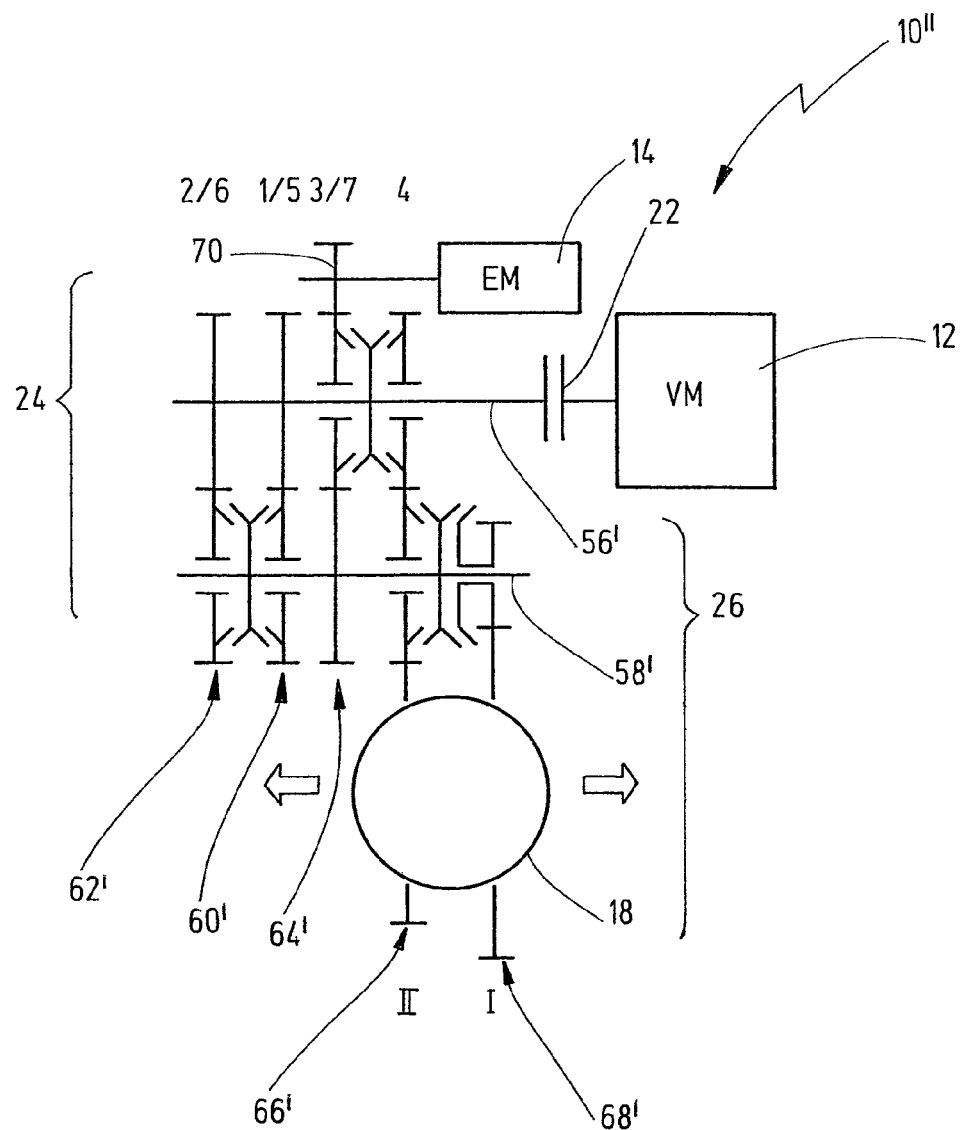
FIG. 4 shows an illustration of a further embodiment, comparable to FIG. 2, of a hybrid drive train according to the invention.

In FIG. 4, an example of a drive train 10" is shown which has seven forward gear ratios and no reverse gear ratio.

The basic design is similar to that of the drive train 10' in FIG. 2.

Instead of the gear set 64 for the reverse gear stage R, a gear set arrangement 64' is provided for the gear ratios 3/7. In this case, the bypass gear set 66' is set up for the gear ratio 4.

In order to engage the gear ratios 1 to 3, in the second transmission group 26 the first transmission ratio I is shifted. In order to set up the forward gear ratios 5, 6, 7, the second gear ratio II in the second transmission group 26 is shifted. Gear ratio 4, which is integrated into the gear set arrangement 66' similarly to the gear ratio 3 in the case of the drive train 10' in FIG. 2, is provided as the bypass gear ratio.

In the case of the drive train 10", the electric machine 14 is connected by its motor shaft to a connecting gear 70 which is in engagement with the freely moving gear of the third gear set arrangement 64'. Consequently, the electric machine 14 also has a drive connection to the layshaft 58' here.

It is readily apparent that drive trains of this type can also be embodied with eight or nine or more forward gear ratios. In this case, if appropriate the number of shift clutches and/or of gear set arrangements can be increased. The embodiments in FIGS. 4 and 6 have the advantage that seven gear ratios can be implemented with just three shift clutch packages (a total of six shift clutches).

In the drive trains described above, direct shifting operations with tractive force assistance are also possible, for example from gear ratio I to gear ratio 3, or from gear ratio 2 to gear ratio 4.

The drive train of FIG. 2 is configured in particular for a front transverse application. However the basic principle of the drive train 10 in FIG. 1 can generally also be applied to an in-line design. In this case for example, a direct gearspeed, in which a transmission input shaft and a transmission output shaft are directly connected to one another, can be implemented as usual. The bypass gear ratio can be implemented by means of the direct gearspeed in this case. Alternatively it is possible to use the direct gear ratio as one of the forward gear ratios of one of the transmission groups. Finally, the drive train can also be applied for trans-axle longitudinal designs, for example in the form of an in-line transmission with built-in angular drive and differential (as a sports car drive with a rear-mounted engine or centre-mounted engine).

The drive trains can be implemented cost-effectively. Only one complex friction clutch has to be provided in the form of a starter/separation clutch and conventional clutch 22. In addition, the number of shafts and the number of shift clutches are very low. Nevertheless, the full functionality of a hybrid drive train can be implemented. For example, the electric machine 14 can be used for boosting. Charging of an electric energy store in the stationary mode is also possible (for example when the shift clutch 46 in FIG. 1 or 2 is closed while the other shift clutches are opened).

In addition it is possible in this way to start the internal combustion engine 12 by means of the electric machine 14. A generator mode for raising the load point can also be implemented. Finally, a recuperation mode is also possible, at any rate in those gear ratios which are not embodied as a bypass gear ratio.

In the embodiments described above, the electric machine 14 is in each case permanently connected to the input of the second transmission group. However, it is also alternatively conceivable to connect the electric machine 14 to the input of the second transmission group via a separation clutch.

The gear set arrangements of the drive trains described above are each implemented as spur gear set arrangements. However, the gear set arrangements can alternatively also be embodied in a planetary design.

What is claimed is:

1. Hybrid drive train for a motor vehicle, having:
   an internal combustion engine for making available internal-combustion-engine drive power;
   a multi-step transmission having a transmission input and a transmission output, wherein the transmission input can be connected to the internal combustion engine, and wherein the multi-step transmission is designed to set up a multiplicity of different forward gear ratios; and
   an electric machine for making available electromotive drive power;
   wherein the multi-step transmission is a range-change transmission having a first transmission group and a downstream second transmission group, wherein an output of the first transmission group forms an input of the second transmission group, so that the multiplicity of different forward-gear ratios is obtained by multiplying the number of transmission ratios which can be set up in the first transmission group by the number of transmission ratios which can be set up in the second transmission group, wherein the second transmission group has a plurality of different transmission ratios, and wherein the electric machine is connected to the input of the second transmission group.

2. Hybrid drive train according to claim 1, wherein at least one forward gear ratio of the multi-step transmission is set up by bypassing the second transmission group.

3. Hybrid drive train according to claim 2, wherein the at least one forward gear ratio, which bypasses the second transmission group, is the n+1th forward gear ratio of the multi-step transmission, wherein n is the number of transmission ratios which can be set up in the first transmission group.

4. Hybrid drive train according to claim 1, wherein the multi-step transmission has the transmission input in the form of a transmission input shaft, and a layshaft.

5. Hybrid drive train according to claim 4, wherein the first transmission group has first wheel set arrangements which are configured to connect the transmission input shaft and the layshaft.

6. Hybrid drive train according to claim 4, wherein the second transmission group has second wheel set arrangements which are configured to connect the layshaft to a differential for distributing drive power between two drive shafts.

7. Hybrid drive train according to claim 5, wherein at least one of the first and a second wheel set arrangements each have a shift clutch.

8. Hybrid drive train according to claim 4, wherein the electric machine is connected to the layshaft.

9. Hybrid drive train according to claim 1, wherein the internal combustion engine is connected to the transmission input via a starter clutch.

10. Motor vehicle having a hybrid drive train, the drive train comprising:
- an internal combustion engine for making available internal-combustion-engine drive power;
- a multi-step transmission having a transmission input and a transmission output, wherein the transmission input can be connected to the internal combustion engine, and wherein the multi-step transmission is designed to set up a multiplicity of different forward gear ratios; and
- an electric machine for making available electromotive drive power;
- wherein the multi-step transmission is a range-change transmission having a first transmission group and a downstream second transmission group, wherein an output of the first transmission group forms an input of the second transmission group, so that the multiplicity of different forward-gear ratios is obtained by multiplying the number of transmission ratios which can be set up in the first transmission group by the number of transmission ratios which can be set up in the second transmission group, wherein the second transmission group has a plurality of different transmission ratios, and wherein the electric machine is connected to the input of the second transmission group.

* * * * *

UNITED STATES PATENT AND TRADEMARK OFFICE
CERTIFICATE OF CORRECTION

| | | |
|---|---|---|
| PATENT NO. | : 8,955,411 B2 | Page 1 of 1 |
| APPLICATION NO. | : 13/529977 | |
| DATED | : February 17, 2015 | |
| INVENTOR(S) | : Stefan Raisch | |

It is certified that error appears in the above-identified patent and that said Letters Patent is hereby corrected as shown below:

In the Specification

In column 9, line 46, change "ratio I" to --ratio 1--.

Signed and Sealed this
Second Day of February, 2016

Michelle K. Lee
*Director of the United States Patent and Trademark Office*